Oct. 18, 1927.

M. C. WHITE 1,645,840

NUT LOCK

Filed Feb. 12, 1927

Inventor:
Martin C. White,

By Riordan & Riordan
Attys.

Patented Oct. 18, 1927.

1,645,840

UNITED STATES PATENT OFFICE.

MARTIN C. WHITE, OF ALTON, ILLINOIS.

NUT LOCK.

Application filed February 12, 1927. Serial No. 167,681.

The object of this invention is to provide a simple device by the use of which retrograde movement of a nut will be prevented and accidental release and loss of the bolt secured by the nut will be avoided.

The invention is illustrated in the accompanying drawing and will be hereinafter fully described, the novel features being particularly pointed out in the appended claims.

In the drawing:—

Figure 1:
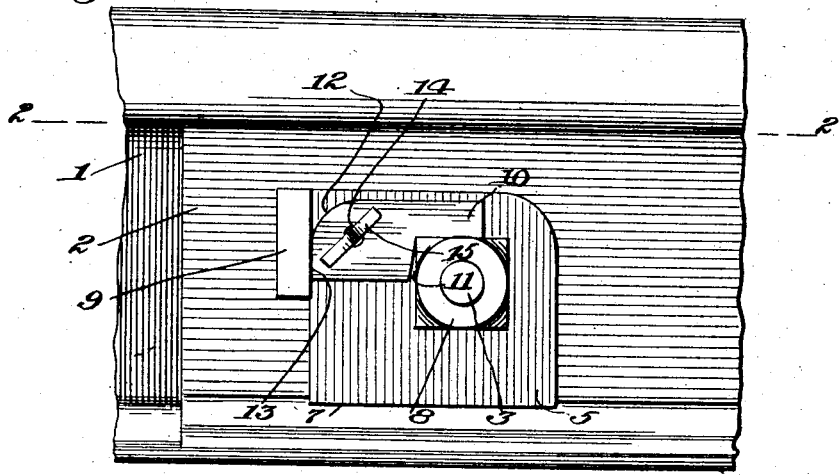
Fig. 1 is an elevation of my improved nut lock, showing one application of the same.
Figure 2:
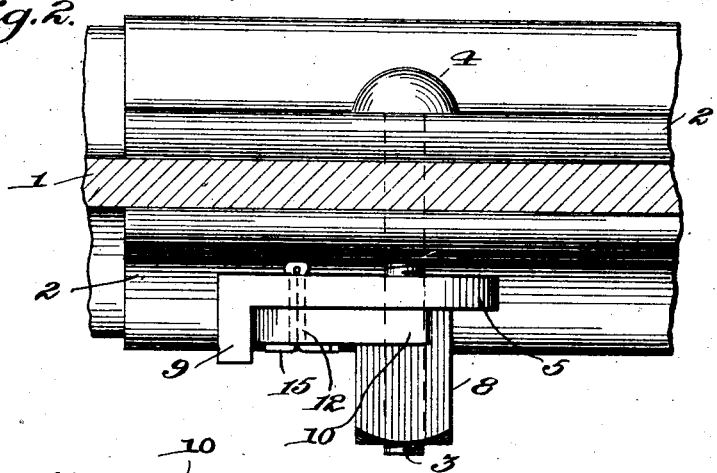
Fig. 2 is a view partly in top plan and partly in horizontal section.
Figure 3:
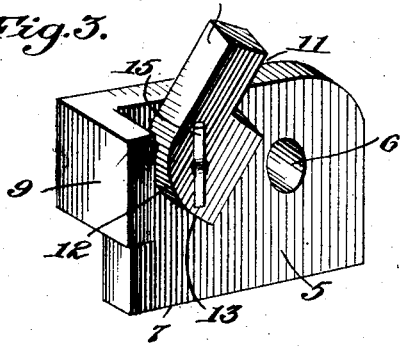
Fig. 3 is a detail perspective.

In the drawing, the numeral 1 designates a portion of a railroad rail against the sides of which are placed fish plates 2. A bolt 3 of usual form is fitted through openings provided therefor in the rail and the fish plates, the head 4 of the bolt bearing against one of the fish plates. Against the other fish plate is disposed a base plate 5 having an opening 6 to accommodate the bolt and having a straight lower edge 7 to bear squarely upon the lower base flange or base of the fish plate and be thereby prevented from turning. The nut 8 is turned home against this base plate to secure the bolt in place. At its upper left-hand corner, the base plate is provided with a lateral lug 9 and pivoted upon the plate adjacent said lug is a dog 10 adapted to extend over the nut and having an angular notch or recess 11 in its lower edge at its free end, whereby to effectually engage a corner of the nut and thereby prevent back turning of the same. The pivotal mounting of the dog will permit it to swing upwardly as it is engaged by a corner of the nut when the latter is being turned home and, to facilitate this action, the upper outer corner of the dog is rounded off concentric with the pivot, as shown at 12. The lower portion of the pivoted end of the dog is straight, as at 13, to abut squarely against the lug 9, and it is to be noted that the pivot 14 is approximately on a line with the upper side of the nut so that the force exerted by the nut in its tendency to loosen will be transmitted through the dog squarely against the lug or abutment 9. The strain upon the pivot is negligible as a result of the described arrangement, and the use of heavy and costly pins is unnecessary. I am consequently, able to use a cotter pin 15 as the pivotal connection between the base plate and the dog, the eye of the pin being disposed between the fish plate and the base plate and the split end being spread against the outer face of the dog, as shown. The removability of the pivot is advantageous when, for any reason, it becomes necessary to repair or renew some part of the device, especially if that part should happen to be a broken or distorted dog. With previous constructions, it was necessary to practically destroy all the parts of the lock in order to remove a broken dog but with my construction it is sufficient to merely straighten the ends of the cotter pin and lift the dog therefrom.

It will be seen from the foregoing description that I have provided an exceedingly simple device by the use of which accidental loosening of a nut will be effectually prevented, while removal of the parts for inspection or repairs will be facilitated.

What I claim as new and desire to secure by Letters Patent of the United States, is:—

1. The combination with a bolt and a nut thereon, of a nut lock comprising a plate through which the bolt passes, an abutment on said plate and a dog pivoted on said plate between the abutment and the top of the nut, said dog having a square shoulder adapted to engage the nut and a straight portion adapted to engage the abutment and a rounded portion operatively between said shoulder and said straight portion.

2. The combination with a bolt, and a nut thereon, of a nut lock comprising a plate through which the bolt passes, an abutment on said plate, and a dog pivoted on said plate between said abutment and the upper portion of the nut, said dog having a portion adapted to engage the upper part of the nut and hold it against back turning and another portion adapted to engage the abutment over a substantial area in a line approximately perpendicular to a line through the pivot of the dog and the top of the nut.

3. The combination with a bolt, and a nut thereon, of a base plate through which the bolt passes, a lateral lug on an upper corner of the plate, a dog to engage the nut, a cotter pin extending through the base plate and the dog and removable therefrom pivotally mounting the dog on the plate adjacent the lug, said dog provided with a recess in its free end to engage the nut and hold it against back turning, the pivoted end of the dog having a straight portion arranged to abut the lug in line with the pivot of the dog and the top of the nut.

4. The combination with a bolt, and a nut thereon, of a base plate through which the bolt passes, a lateral lug on an upper corner of the plate, a dog to engage the nut, means extending through the base plate and the dog and removable therefrom pivotally mounting the dog on the plate adjacent the lug, said dog provided with a recess in its free end to engage the nut and hold it against back turning, the pivoted end of the dog having a straight portion arranged to abut the lug in line with the pivot of the dog and the top of the nut.

In testimony whereof I hereunto affix my signature.

MARTIN C. WHITE.